(12) United States Patent
Kiler

(10) Patent No.: US 7,147,355 B1
(45) Date of Patent: Dec. 12, 2006

(54) APPARATUS TO ILLUMINATE AN AUTOMOBILE GRILL

(76) Inventor: Tim Kiler, 2214 NW. 14 Ave., Boynton Beach, FL (US) 33436

( * ) Notice: Subject to any disclaimer, the term of this patent is extended or adjusted under 35 U.S.C. 154(b) by 0 days.

(21) Appl. No.: 10/998,439

(22) Filed: Nov. 29, 2004

(51) Int. Cl.
*B60Q 1/28* (2006.01)

(52) U.S. Cl. ........................................ 362/496; 362/554

(58) Field of Classification Search ................ 362/551, 362/552, 554, 555, 583, 573, 574, 581, 487, 362/496, 502, 505, 293, 295, 394
See application file for complete search history.

(56) References Cited

U.S. PATENT DOCUMENTS

| | | | |
|---|---|---|---|
| 4,747,648 A | * | 5/1988 | Gilliland, III ................ 362/554 |
| 4,816,968 A | | 3/1989 | Yamada |
| 4,920,460 A | | 4/1990 | Mori |
| 4,977,487 A | * | 12/1990 | Okano ........................ 362/555 |
| 5,424,924 A | | 6/1995 | Ewing |
| 5,497,303 A | | 3/1996 | Decinti |
| 5,779,345 A | | 7/1998 | Adams |
| D455,683 S | | 4/2002 | Leazenby |
| 6,382,824 B1 | * | 5/2002 | Prasad et al. ................ 362/551 |

* cited by examiner

*Primary Examiner*—Y. My Quach-Lee

(57) ABSTRACT

A lighting system integrated within an automobile grill that allows a user to have different color lighting and brightness. The lighting system has a light generator with a color disc to be rotated by a synchronous motor and a xenon bulb to be controlled by a light control module. The light control module to control the color disc and brightness of the xenon bulb. The grille to have fiber optic wiring to receive the refracted light from the color disc via a bulb beam.

2 Claims, 3 Drawing Sheets high# APPARATUS TO ILLUMINATE AN AUTOMOBILE GRILL

BACKGROUND

1. Field

The present disclosure pertains to an apparatus to illuminate an automobile grill.

2. Description of Related Art

Several auxiliary automobile light fixtures exist in the art. Patents such as U.S. Pat. Nos. 4,920,460, 4,816,968, 5,779,345, 5,497,303, and 5,424,924 are all light fixtures that can attach to the front end of an automobile.

The previously mentioned apparatuses all provide a way of illuminating the front of an automobile in addition to the headlights. None of these apparatuses, however, integrates lighting and the actual grill of an automobile.

BRIEF DESCRIPTION OF THE FIGURES

The present invention is illustrated by way of example and not limitation in the figures of the accompanying drawings.

DETAILED DESCRIPTION

The following description provides an apparatus to illuminate an automobile grill. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement the apparatus to illuminate an automobile grill.

The present invention is a lighting system for an automobile, which comprises a light generator, control module, control panel, and grill. A lighting system integrated within an automobile grill that allows a user to have different color lighting and brightness. The lighting system has a light generator with a color disc to be rotated by a synchronous motor and a xenon bulb to be controlled by a light control module. The light control module to control the color disc and brightness of the xenon bulb. The grille to have fiber optic wiring to receive the refracted light from the color disc via a bulb beam.

Figure 1:
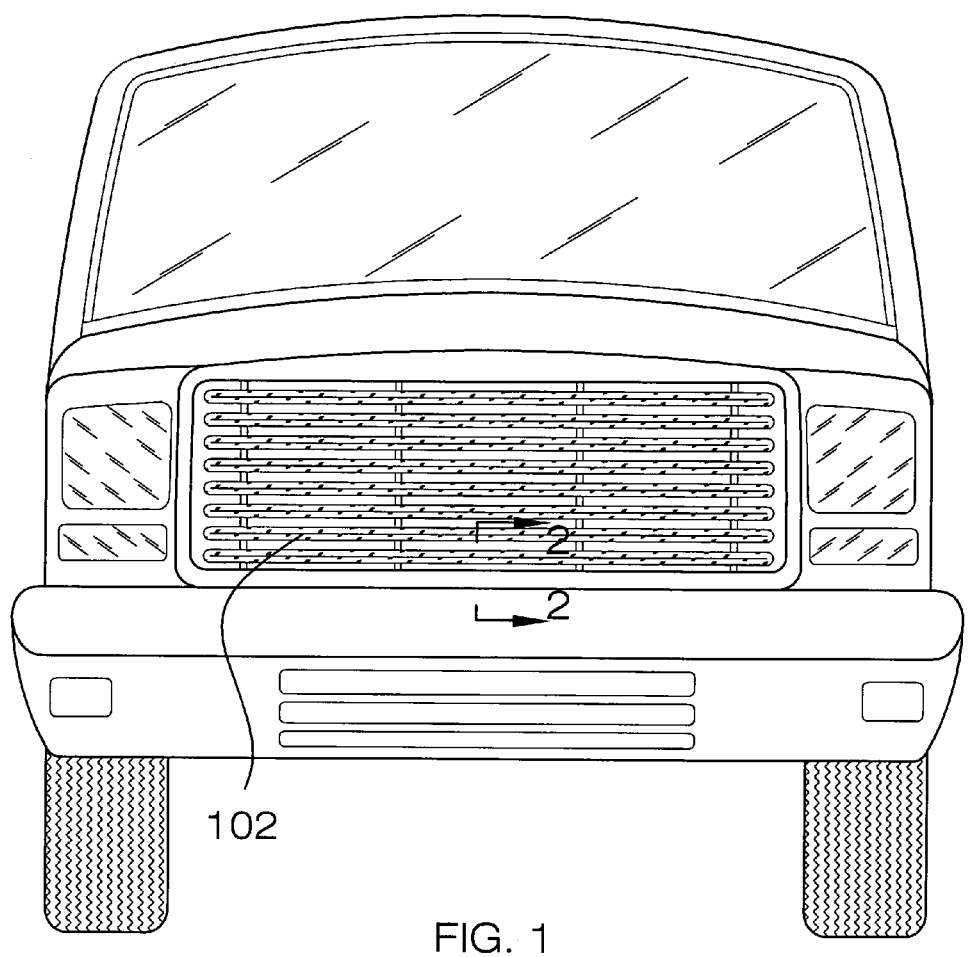
FIG. 1 illustrates a front elevational view of a grille as utilized by an embodiment.

FIG. 1 illustrates a front elevational view of an grille as utilized by an embodiment. In this embodiment, either fiber optic or monofilament tubing has replaced the internal portions of the grill's ribs. The fiber optic or monofilament tubing will receive the refracted light from the color disc via a bulb beam, which is discussed in further detail in connection with FIGS. 5 and 6.

Figure 2:
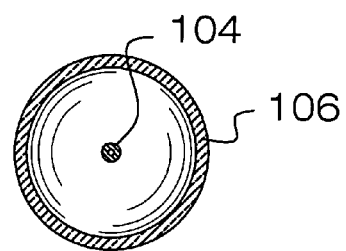
FIG. 2 illustrates a plain sectional view of a single tubular unit, which constitute part of the whole apparatus. The Figure features a monofilament and a glass tube.

FIG. 2 illustrates a plain sectional view of a single tubular unit, which constitute part of the whole apparatus. The Figure features a monofilament and a glass tube. This view depicts the embodiment wherein the grill's ribs have monofilament tubing.

Figure 3:
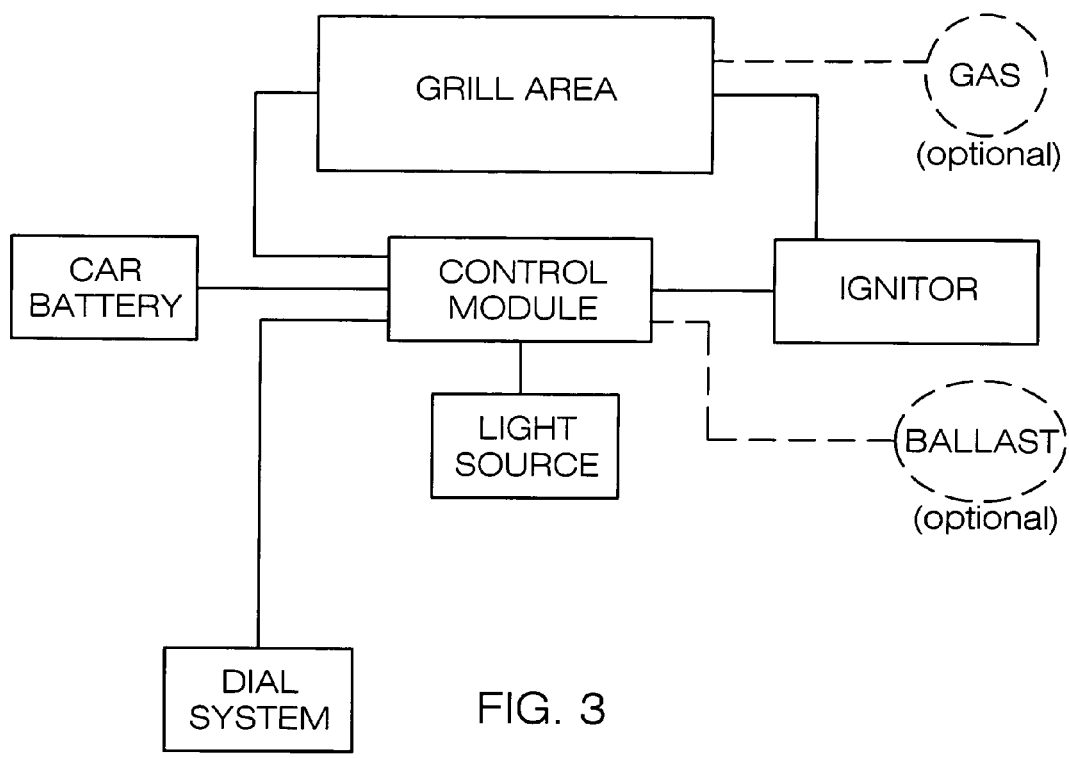
FIG. 3 illustrates a flowchart of the interconnection of components.

FIG. 3 illustrates a flowchart of the interconnection of components. The grill has been discussed in connection with FIGS. 1 and 2 and is to receive refracted light from the light source. The light source is the light generator that is discussed in further detail in connection with FIGS. 5 and 6. In one embodiment, the control module utilizes a dial switch for intensity that is General Motors part number 1995373 and a rheostat switch for color that is either GM number 16502591 and 16504065.

Figure 4:
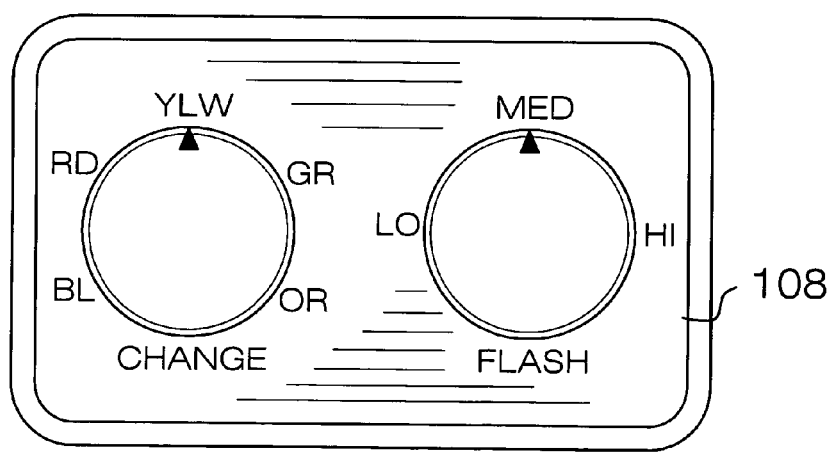
FIG. 4 illustrates a front elevational view of the control panel. The Figure features two rotary dials encased in a housing.
Figure 5:
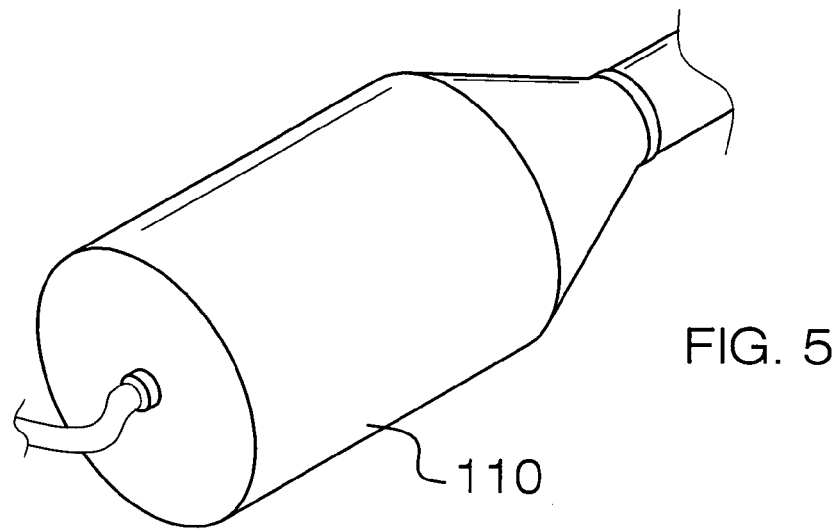
FIG. 5 illustrates a front elevational exterior view of the Light Generator.

FIG. 4 illustrates a front elevational view of the control panel. The Figure features two rotary dials encased in a housing. This drill switch was discussed in the previous paragraph. FIG. 5 illustrates a front elevational exterior view of the Light Generator. A more detailed discussion follows in the next paragraph.

Figure 6:
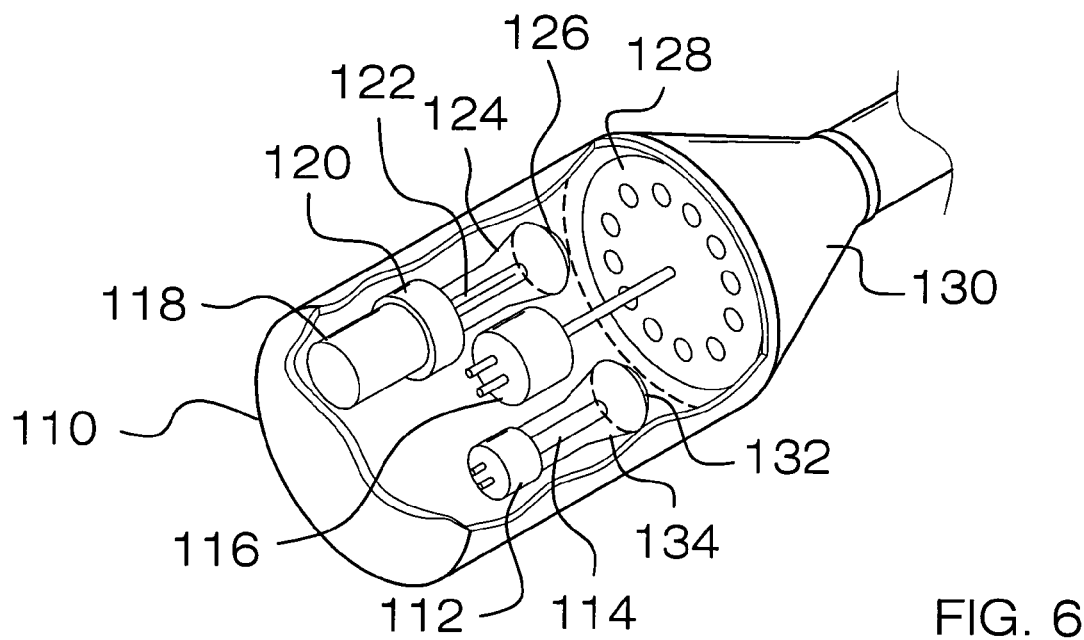
FIG. 6 illustrates an internal view of the Light Generator.

FIG. 6 illustrates an internal view of the Light Generator—110—. In one embodiment, the lgiht generator utilizes a part from General Electric, designated as an "Angel Tree Top" that includes a Bulb—114—, color disc—128—, bulb socket—112—, xenon socket—120—, bulb housing—124—, magnified lens—126—, cone—130—, bulb housing—134—, and synchronous motor—116—. The color disc inside is rotated by a synchronous motor. This motor rotates the color disc to the colors programmed. The bulb beam refracts the color into the fiber optic. The Xenon bulb—122— is also located alongside the regular bulb and is controlled by the Light Control Module. In one embodiment, the Xenon bulb part number: SAAB number 12 790 588. The light generator also has a ballast igniter—118—, and in one embodiment is a General Motors part, "GM part number 12335983.

What is claimed is:

1. A lighting system integrated within an automobile grille comprising:

a light generator having a color disc rotated by a synchronous motor and a xenon bulb controlled by a light control module;

the light control module controlling the color disc and brightness of the xenon bulb;

the grille having fiber optic wiring receiving the light from the color disc via a bulb beam;

the light control module receiving a user input from a dial control panel that selects a color and an intensity;

the light generator generating an output color based on the color disc; and the color disc receiving light from the xenon bulb and a ballast igniter via a first magnified lens and from a halogen bulb within a bulb housing via a second magnified lens.

2. A lighting system integrated within an automobile grille comprising:

a light generator having a color disc rotated by a synchronous motor and a xenon bulb controlled by a light control module;

the light control module controlling the color disc and brightness of the xenon bulb;

the grille having monofilament tubing receiving the light from the color disc via a bulb beam;

the light control module receiving a user input from a dial control panel that selects a color and an intensity;

the light generator generating an output color based on the color disc; and the color disc receiving light from the xenon bulb and a ballast igniter via a first magnified lens and from a halogen bulb within a bulb housing via a second magnified lens.

* * * * *